Figure 1:
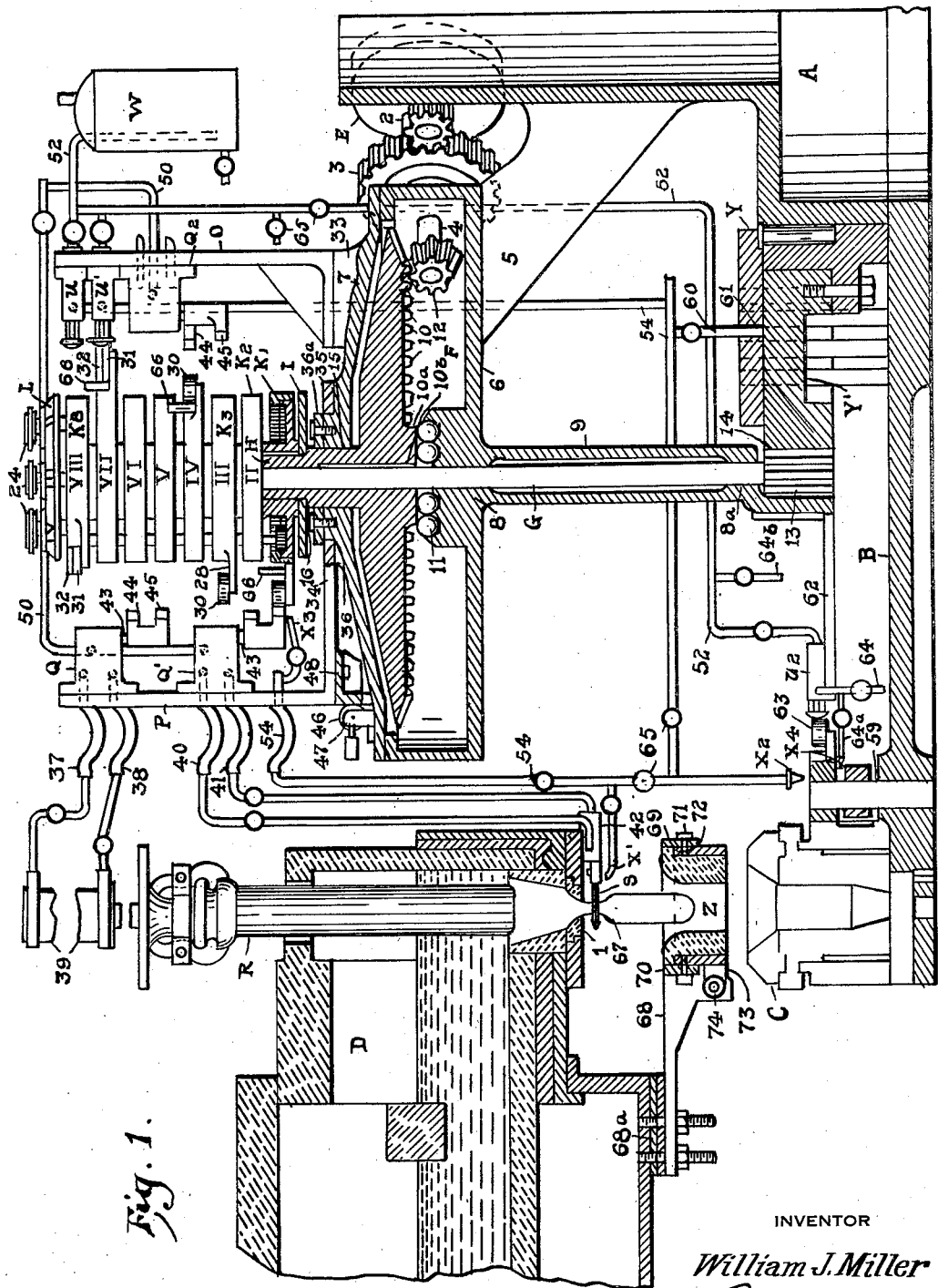

Oct. 20, 1931.  W. J. MILLER  1,828,674
MECHANISM FOR MANUFACTURING GLASSWARE
Original Filed May 29, 1924   3 Sheets-Sheet 1

INVENTOR
William J. Miller
by Robert D Brun
Attorney

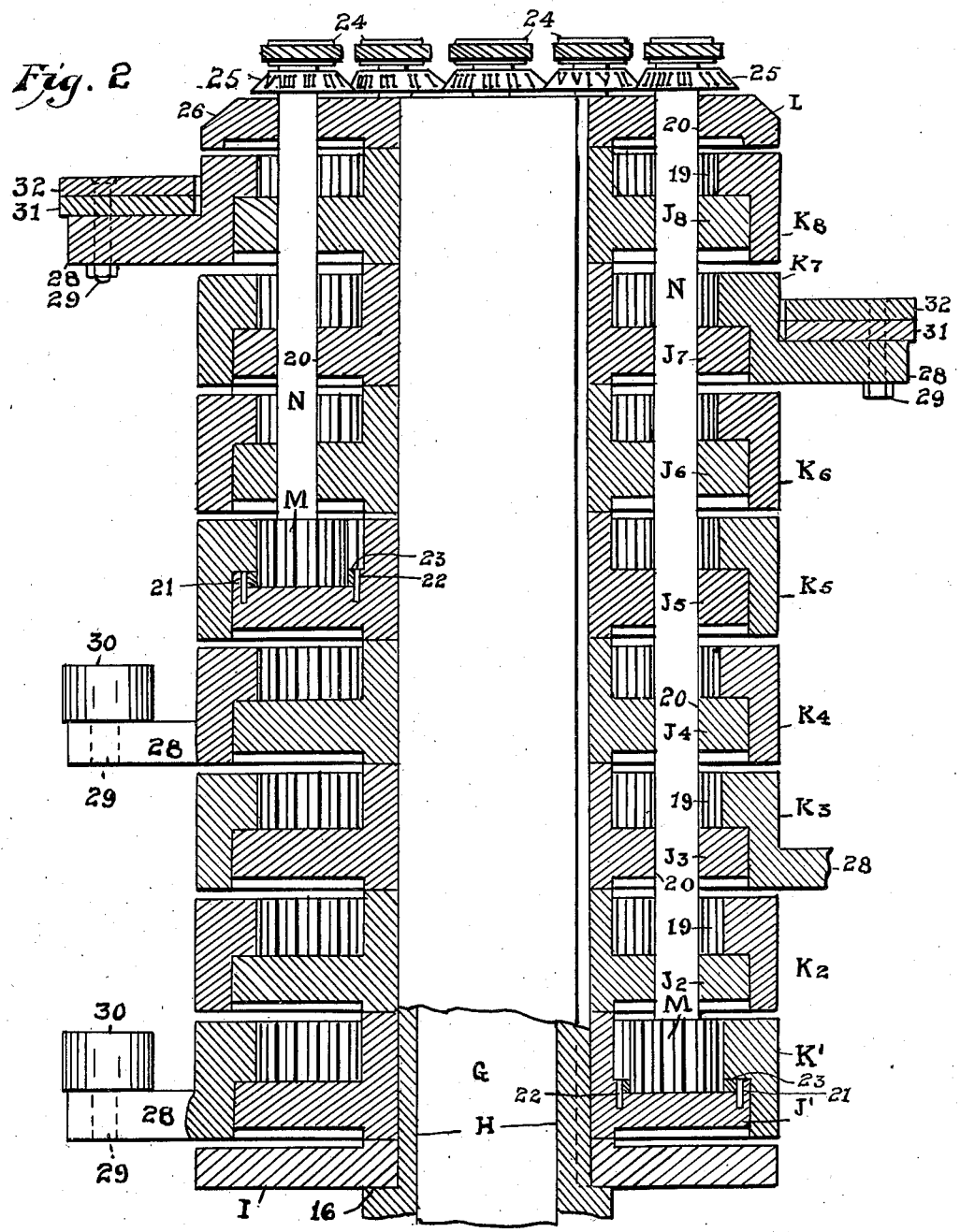

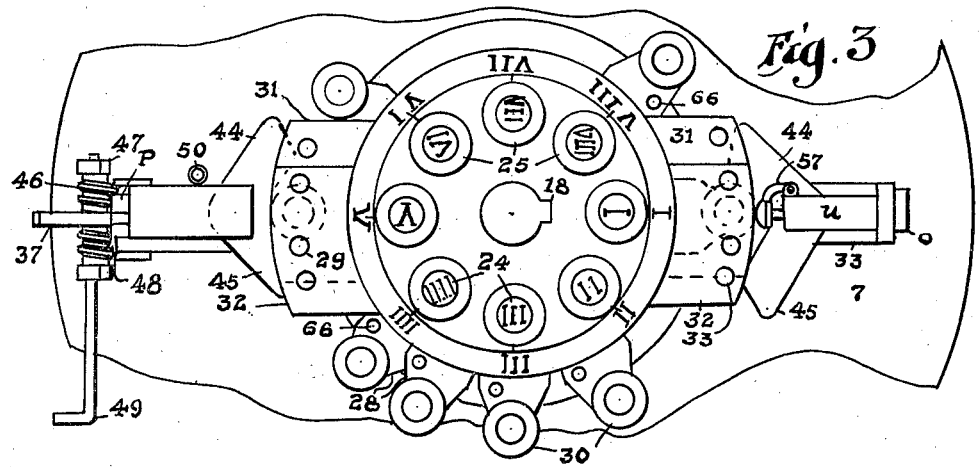
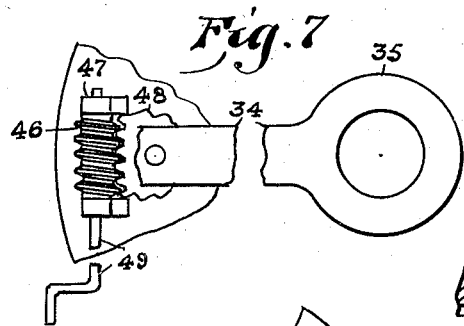
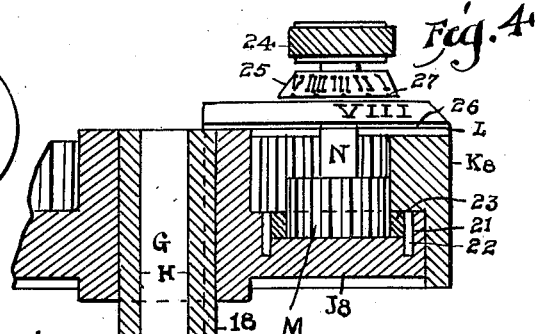

Patented Oct. 20, 1931

1,828,674

UNITED STATES PATENT OFFICE

WILLIAM J. MILLER, OF SWISSVALE, PENNSYLVANIA, ASSIGNOR TO HARTFORD-EMPIRE COMPANY, OF HARTFORD, CONNECTICUT, A CORPORATION OF CONNECTICUT

MECHANISM FOR MANUFACTURING GLASSWARE

Original application filed May 29, 1924, Serial No. 716,835. Divided and this application filed August 15, 1928. Serial No. 299,731.

This application is a division of my preceding application Serial Number 716,835, filed May 29th, 1924, which issued as Patent 1,684,064, on September 11, 1928.

One feature of my present invention relates to the lubrication and to the variable control of the application of lubrication to glass machinery such as feeding mechanisms and fabricating machines.

The moving parts of such mechanisms require adequate lubrication and the application of such lubrication must be properly timed with the speeds of such parts, and as such speeds are increased or decreased, the moments of application of the lubrication must be varied to obtain the necessary lead, so that the lubricant and the moving parts will form the proper conjunction.

For this purpose I provide new and improved means for lubricating mechanisms of the character mentioned with provision for varying the timing of the application of the lubricant to moving parts.

Thus the speeding up of one of a group of associated glass mechanisms, for example, the speeding up of the feeder relative to the glass fabricating machine requires the advancing of the moments of the application of lubricant to the moving parts of the feeder, and, vice versa, the relative slowing down of the feeder requires the delaying of such moments.

In glass machinery a guide, often of funnel form, is frequently employed to direct or convey the mold charges from the orifice of the feeder to the molds of the fabricating machine.

In cases where the mold charges are delivered to moving molds, the manner of delivery must be varied in accordance with the speed of the molds' travel.

Thus a guide having its axis of delivery vertically disposed, while proper for feeding mold charges to stationary or slowly moving molds, would be unsatisfactory in the case of molds moving at a greater speed, since the descending mold charge would strike the wall of the mold and thus be irregularly chilled or distorted.

As the speed of the mold travel is increased, the axis of delivery of the guide must be tilted, its lower end being moved in the direction of the molds' travel, so that the mold charges will fall true into the molds without striking the walls thereof.

I therefore provide a new and improved guide mechanism which may be adjusted to meet the requirements of various mold speeds.

Other novel features of construction, and also of arrangement of parts, will appear from the following description.

In the accompanying drawings, wherein I have illustrated a practical embodiment of the principles of my invention, Fig. 1 is a diagrammatic view of a timer, embodying the principles of my present invention, applied to a rotary glass fabricating machine receiving its mold charges from an automatic feeder of the plunger type, the operation of the feeder and of the lubricating devices being timed from the operation of the fabricating machine; Fig. 2 is an enlarged vertical section of the timing device proper; Fig. 3 is a reduced plan view of the same; Fig. 4 is an enlarged detail in section showing one of the cam rings, its supporting disk and the mechanism for adjusting the cam ring on the disk; Fig. 5 is a broken plan view showing one of the disks on which the cam rings are supported; Fig. 6 is a reduced diametric section of one of the cam rings, also showing a modified form of roller mounting; Fig. 6a is a detail also showing such modified mounting; Fig. 7 is a broken view in detail showing the means for adjusting the adjustable valve stand; Fig. 8 is a sectional view showing one of the timed lubricating valves; Fig. 9 is a similar view of one of the lubricant discharge nozzles; Fig. 10 is an illustrative view showing the manner of using the latter, and Fig. 11 is a detail of the mounting of the adjustable funnel guide.

The following is a detailed description of the drawings:

A represents a stationary part of a glass fabricating machine, such as the central pedestal or support on which the mold table B is rotatably mounted. C represents one of an annular series of molds mounted on said table concentrically therewith and brought in turn by the rotation of the table in feeding relation to the discharge orifice 1 of the automatic feeder D, which latter is shown as of the reciprocating plunger type.

E represents a variable speed electric motor carried on the support A and having its shaft provided with a pinion 2 meshing with a gear 3 on the outer end of a shaft 4 which is journaled in bearings on the side wall of the circular casing F. The casing F is fixedly supported in place by means of the bracket 5 extending from the support A. The casing F has a permanent bottom 6 and a removable lid 7.

G is a vertically disposed shaft which is journaled in the sleeve bearing 8 of the bottom 6 of the casing F and the bearing 8a in the lower end of a sleeve 9 which depends axially from the casing F. 10 is a beveled gear fixed on the shaft G within the casing F and having its hub 10a supported by the anti-friction thrust bearing 11 which also serves to support the shaft G at proper elevation. The inner end of the shaft 4 carries a pinion 12 which is in mesh with the gear 10.

In the fabricating machine illustrated, the mold table is of the constantly rotating type, and is shown driven directly from the shaft G by means of a pinion 13 on the lower end of said shaft meshed with an annular gear 14 which forms part of and is concentric of the mold table. Thus the molds are presented in turn to the feeder by the rotation of the table. By speeding up or slowing down the motor the speed of operation of the glass fabricating machine may be adjusted to suit the purposes in view.

H represents a sleeve fixed on the upper end of the shaft G, and which has its lower end journaled in a bearing 15 in the lid 7 of the casing F. The gear 10 and the sleeve H may be keyed to the shaft G, as by means of the longitudinal fin 10b of the shaft engaging notches in the gear and sleeve. A short distance above the lid 7 the sleeve H is provided with a shoulder 16 upon which rests an annular bottom plate I which is slipped down on the sleeve H. A stack of disks is slipped down over the sleeve H, said disks being severally indicated by the letter J, the bottom disk $J^1$ being supported by its hub on the bottom plate I, while the remaining disks $J^2, J^3, J^4, J^5, J^6, J^7$ and $J^8$ are supported in superimposed relation by their hubs. Each of the disks supports a cam ring, said rings being indicated at $K^1, K^2, K^3, K^4, K^5, K^6, K^7$, and $K^8$. Said rings are of differential bore, their lower and larger bores fitting down over the corresponding disks J, and the rings being thus rotatably mounted on their disks, preferably with sufficient clearance between adjacent rings to prevent interference.

L is a cover plate which slips down on the upper end of the sleeve H and is supported on the hub of the top disk $J^8$. The bottom plate I, the disks J and the cover plate L are fixed to the sleeve H as by the key 18. The upper and smaller bores of the rings K are toothed to form the internal gears 19. The letter M represents pinions, each of said pinions being in mesh with the internal gears 19 of a cam ring K. Each of said pinions is fixed on the lower end of a shaft N, which shafts extend down through sets of alined holes 20 in the cover plate L and in the disks J positioned above the cam ring with which its associate pinion is meshed. Said shafts are spaced apart in annular series concentric with the sleeve H. Each disk J is provided with a sunken seat 21 axially alined with the associated shaft N, and in said seats are seated and fixed, as by the pins 22, the internal gear or locking gears 23 with which the lower portions of the pinions M may be meshed by lowering the corresponding shafts N until the pinion seats within the locking gear. It is evident that when a pinion M is meshed with the corresponding locking gear 23 and also with the internal gear 19 of the corresponding cam ring K, said cam ring is locked against rotary movement relative to its disk. It is also evident that by raising the shaft, its pinion may be drawn up out of mesh with the locking gear 23 while remaining in mesh with the internal gear 19 of the cam ring, thus unlocking the cam ring and permitting its adjustment relative to its disk, which adjustment is accomplished by rotating the associated shaft, and thus turning the ring on its disk. When the proper adjustment has been made, the pinion M is again dropped down into mesh with the fixed locking gear 23, thus once more locking the associated cam ring fixedly to its disk. The upper ends of the shafts N are provided with knobs 24, which may be grasped to raise a shaft to unlock its associated cam ring, to rotate the shaft for adjusting the cam ring on its disk, and to drop the shaft to relock the adjusted cam ring to its disk.

For convenience in determining the proper adjustment, said knobs are provided with numbers or other distinguishing symbols on their tops, while similar numbers or symbols are placed on the outer perimeters of the corresponding cam rings. Thus in Fig. 1 the cam rings are numbered upwardly from I to VIII in Roman numerals, and in Fig. 3 the corresponding knobs 24 are similarly numbered so that an operator will know that by manipulating one of said knobs he may unlock, adjust and relock the cam ring which is similarly numbered. If preferred the perimeters of the cam rings may be painted in contrasting colors and the corresponding knobs, valves, connecting pipes, etc., similarly colored, so that the operator may tell at a glance what knob to operate for the adjustment of the actuation of any particular control member.

The knobs 24 are provided with flared annular skirts 25 which are provided with a circumferential series of graduations which may be numbered with Roman numerals or otherwise distinguished so that the operator may quickly and accurately adjust a cam ring to a predetermined relation, as, for instance, that shown on a chart. To further assist in this adjustment, the cover plate L is provided with a beveled edge 26 which opposite each of the shaft positions is marked with an arrow head or other indicator 27 in relation to which the graduations on the knob may be adjusted, as required to obtain the desired adjustment of the corresponding cam ring. Each of said arrow heads or other markers is associated with the same number or symbol marked on the surface 26 as that on the knob of the corresponding shaft. This assists in the rapid assemblage of the timer, and also the adjustment of its actuating parts.

When the timer is to be adjusted for use for timing a given group of mechanisms to obtain certain predetermined results the operator is provided with a chart indicating how the cam rings are to be adjusted, and the operator by consulting his chart can tell into what position each particular cam ring is to be turned.

The top of the timer is free from all obstacles or projections, except the knobs 24, and it is practical for an operator to grasp the knob, raise it and turn it in either direction to adjust the corresponding cam ring, while the timer is in motion. This is a very important feature, as it makes practical the adjustment of the individual cam rings while the mechanisms are in operation, and therefore makes possible and convenient a degree of nicety and accuracy in adjustment which would be impossible were it necessary to stop the operation of the timer.

The cam rings K are provided with perimetral striking or contact means which, as the rings revolve, intermittently actuate valves or other control elements mounted in their paths.

In the case of all of the cam rings K, except the two upper rings $K^7$ and $K^8$, the actuation is momentary. In the case of the two upper rings the actuation is more prolonged.

Thus the cam rings are provided with radially projecting brackets 28 provided at their outer ends with upwardly extending pins 29 upon which are rotatably mounted the contact rollers 30.

In the case of the upper rings $K^7$ and $K^8$, the rollers 30 are omitted, and arcuate cam plates 31 and 32 are substituted. Such plates have their inner perimetral edges curved to fit snugly against the perimeter of the cam ring while their outer and concentric perimetral edges form the contact surfaces which actuate the associated valves or other elements. The plates are held in place by the pins 29 which extend up through holes in the arcuate plates. By providing two plates for each bracket and providing each plate with a plurality of pin holes, the effective actuating length of the cam may be adjusted by shifting the plates relative to each other on the pin.

In Figs. 6 and 6a I show a modified form of mounting the rollers 30 on the cam rings K. Thus instead of the integral or fixed bracket 28 shown in Fig. 1, the roller bracket 28a is provided with an arcuate base 28b which slides in an undercut slot 28c in the perimeter of the cam ring K. Thus the roller and its bracket may be slid circumferentially of the cam ring to adjust the position of the roller relative thereto. At one point the slot is fully open, as shown at 28d in Fig. 6, so that the bracket may be detached from the cam ring by moving it to the open portion of the slot. The bracket may be fixed in any adjusted position by means of the set screws 28e which engage threaded holes in the bracket base and may be screwed in against the cam ring, thus jamming the bracket base against the front walls of the slot.

Where momentary actuation is required, as in the case of a rotary valve controlling the admission of fluid pressure to a double-acting cylinder, I prefer to use the roller 30, but where a relatively prolonged actuation is desired, as in the case of spring-closed, plunger valves controlling the application of lubricant to moving parts, I may use a cam plate; and where the period of actuation is to be adjustable, I use a pair of cam plates so that the effective length of the actuating edge may be varied.

The modified form 28a of bracket shown in Figs. 6 and 6a may be used in connection with the cam plate or plates, thus making them adjustable relative to the cam rings.

In the embodiment shown in the drawings, I have shown the actuated elements, which control the operations of the associated mechanisms or mechanical operations as valves, some being of the rotary type and others of the spring-closed, plunger types. It is of course apparent to those skilled in the art that various types of valves or other control devices may be used.

The valves or other control devices may be fixed in relation to the cam rings; or may be adjustable in relation thereto, preferably while the timer is in normal operation.

Thus O is a vertically disposed valve stand secured at one side of the timer on a base 33 which may be integral with the lid 7 of the casing F, the stand O being fixed in position relative to the timer.

Again, at the other side of the timer is a second vertically disposed valve stand P which is adjustable in its position relative to the timer, so as to advance or retard the actuation of its valves relative to the actuation of the valves on stand O. Thus, as shown in Figs. 1 and 7, the base of said stand is an inwardly extending horizontal leg 34 ending in an annulus or hub 35 which fits over a circular boss 36 on the lid 7 concentric with the bearing 15. 36a is a holder ring bolted down on said base above and overlapping said annulus 35 to hold it slidably in place. It is thus seeen that the stand P may be moved relative to the timer, with the axis of the timer as its center of movement.

Mounted on the stand P are two four-way valves Q and Q'. The valve Q is connected by the pipes 37 and 38 to the upper and lower ends of the cylinder 39 of the feeder plunger R, while the valve Q' is connected by the pipes 40 and 41 to the front and rear ends of the cylinder 42 which operates the shear blades of the feeder D. The valves are shown with rotary operative stems 43 provided with pairs of opposed cam wings 44 and 45 which are in the paths of the rollers 30 of the adjacent cam rings of the timer. Thus, the valve Q is operated in one direction by the cam roller 30 of the cam ring V and is operated in the opposite direction by the roller 30 of the cam ring VI. Likewise, the valve Q' is operated in one direction by the roller 30 of the cam ring I and in the other direction by the roller 30 of the cam ring II. It is thus evident that with the valve stand P fixed against movement in the position desired, the cam rings V, VI, I and II may be adjusted so that their rollers 30 will actuate the valves Q and Q' in such manner that the plunger R will be reciprocated and the shears S will be opened and closed in the proper timed relation with the rotation of the mold table B to properly deliver the gobs of the proper character to the molds C as they are in turn brought into feeding relation with the orifice 1 by the rotation of the table.

The position of the valve stand P relative to the timer may be adjusted by means of a horizontally disposed worm 46 journaled in the stand 47 mounted on the lid 7 and meshing with a small rack 48 fixed to the valve stand P. 49 is a crank handle by means of which the worm 46 may be turned to swing the valve stand P either clockwise or counter-clockwise relative to the timer. When idle, the worm 46 acts as a lock to hold the stand P stationary.

When the mold table is rotating at a relatively slow speed, it is necessary, to insure the dropping of the gobs at the proper instant into the molds, to retard the action of the feeder relative to the approach of the molds to feeding relation, and therefore in such case the valve stand P is shifted into such position relative to the timer that the actuation of the plunger and shear control valves is retarded. As the speed of the machine is increased it is necessary to advance the operation of the feeder so that the gobs may be properly deposited in conjunction with the rapidly moving molds. In such case the valve stand P is moved for the proper distance in the opposite direction to advance the operation of the feeder.

I show mounted on the valve stand O a rotary valve $Q^2$ which may be connected to the fluid pressure cylinder which operates some part of the fabricating machine, such for instance, as the presser cylinder or blow head cylinder.

Thus the operation of the mechanism controlled by the valve $Q^2$ is timed in constant relation to the speed of the mold table, while the operation of the plunger for the gob delivery function may be adjusted in relation to the speed of mold travel.

50 represents a compressed air supply line connected to each of the valves Q and $Q^1$ and $Q^2$, and said valves are also provided with the usual relief ports to atmosphere, so that when the valve is turned in one direction fluid pressure is admitted to one end of its associate cylinder and relieved from the other end thereof, and when the valve is thrown to the other position the fluid pressure is admitted to the second named end of the cylinder and relieved from the first named end thereof.

U and U' represent a pair of lubricant control valves which are mounted on the stand O and are actuated by the cam plates 31 and 32 of the cam rings $K^7$ and $K^8$. The construction of the form of valve preferred is shown in Fig. 8. Thus, the rear end of the valve is provided with a port 51 which is connected by the branched pipe 52 with a reservoir W in which is maintained a supply of lubricating oil under delivery pressure. At the other end of the valve chamber a lateral port 53 is connected to the branched pipe 54 for the delivery of the oil to the moving parts which are to be lubricated. Intermediate of the ports 51 and 53 is a valve seat 55 normally closed by the spring seated valve 56. The stem of the valve 56 protrudes through the front of the valve casing against which bears the adjustable contact knob 57 carried on the end of the swinging arm 58 pivoted to the valve casing. When the cam plates of the cam rings $K^7$ and $K^8$ come in turn into contact with the knobs 57 the valves are opened and held open until the plates are moved past the knobs, whereupon the valves automatically close. It is evident that the opening of the valves U and $U^1$, in turn, results in oil under pressure being ejected along the pipe 54.

The pipe 54 is branched and leads to various portions of the mechanisms which require intermittent lubrication.

In Fig. 9 I show a preferred form of nozzle X for ejecting the oil at the pipe ends, the discharge passage being cone shaped and adjustable by means of the screw mounted cap 59, so that the nozzle may be adjusted to either squirt or spray the oil. Thus one of the branches of the pipe 54 ends adjacent to the shear blades S in their closed position and is provided with a nozzle $X^1$ which is adjusted for ejecting a thin spray of oil upon the blades as they close. Another end of said pipe 54 depends above the path of the hinge pins 59a of the molds C as they in turn pass the feed position and is provided with a nozzle $X^2$ for the discharge of oil upon the mold hinges as they pass. In such case the cap of the nozzle $X^2$ is adjusted to provide for a more copious discharge than in the case of the nozzle lubricating the shear blades. Another end of the pipe 54 is shown adjacent to one of the cam ring rollers 30 so that its nozzle $X^3$ will discharge oil on the roller as it passes.

It is evident that these pipe ends may be positioned wherever needed and the control valves timed to discharge the oil as the moving part, which is to be lubricated, passes the nozzle. The pipe 54 may be extended to furnish a supply of oil to parts in continuous moving contact. Thus at 60 I show a branch of said pipe connected to a port 61 in the stationary valve cap member Y with which the ported portion $Y^1$ of the mold table is in sliding contact.

Again, for the purpose of illustrating other methods of controlled lubrication, the branched pipe 52 is shown connected to a spring closed, plunger valve $U^2$ mounted on a bracket 62 extending from the sleeve 9, said plunger valve being opened at intervals by the rollers 63 carried by the hinge lug of the molds C, so as each mold passes the valve $U^2$, a quantity of oil is squirted through the outlet pipe 64 on some moving part requiring lubrication. The pipe 64 is preferably flexible, such as a copper tube, so that it may be bent to correctly deposit or direct the discharge of lubricant.

A branch 64a of the pipe 64 may be properly directed to discharge oil on the mold hinges, the pipes 64 and 64a being provided with valves to shut off the discharge from either or both, and the pipe 64a being provided with a nozzle $X^4$. At 64b I show a discharge tube connected to the pipe 52 for the constant discharge of oil to a bearing or other mechanism requiring a continuous supply of oil.

I have shown the lubricant control valves U and U' mounted on the fixed mold stand O, so that their operation will be timed with the rotation of the mold table. However, where the lubricant is squirted or ejected onto moving parts as they pass the oil nozzle or nozzles, variations in the speed of the moving parts require the retarding or advancing of the moment of the ejection of the lubricant, so that the proper lead may be obtained to provide the necessary conjunction between the discharge of oil and the position of the moving part to be lubricated. I may therefore mount certain of the lubricant control valves on the adjustable stand P, so that such lubrication may be advanced or retarded, as in the case of the operative movement of the feeder plunger and shears, to compensate for different mold table speeds.

The oil pipes 52 and 54 and their branches are provided with shut-off cocks 65 at suitable points so that the lubricant may be shut off from individual nozzles X as found necessary.

In Fig. 10 I have indicated an enclosed moving part into which the oil nozzle X is shown squirting lubricant at the proper moment of conjunction.

Where two adjacent cam rings are used to actuate a double acting valve, such as the rotary valves Q, $Q^1$ and $Q^2$ in opposite directions, unless some means were provided to prevent a careless adjustment of the rings bringing their actuating members into such close proximity as to actuate the valve simultaneously or almost simultaneously in opposite directions, the proper operation of the valve would be interfered with and breakage might ensue.

To prevent such careless adjustment, I provide suitable means to limit the proximity of the actuating rollers of adjacent rings. Thus the bracket 28 of the lower of the pair of rings is provided with an upstanding pin 66 which extends into the path of the bracket 28 of the cam ring next above and therefore limits the adjustment of the upper cam ring so that the two rollers 30 cannot be brought into such proximity as to improperly actuate the valve.

At Z in Fig. 1, I show the funnel-guide which directs the gob of glass or mold charge 67 into the mold C which is traveling through the feeding position. Where the mold table is traveling at a relatively low speed, the axis of the throat of the funnel Z may be vertically disposed, as shown, but as the speed of the mold table is increased, it is necessary to drop the gob more quickly and in such a manner that it will not hit on the side of the mold cavity but drop truly thereinto. Thus, I mount the funnel Z under the orifice 1 in such a manner that its axis may be tilted from the vertical into a position with its lower end advanced in the direction of the movement of the mold. The higher the speed of the mold's travel, the greater must be such inclination. The mounting of the funnel is shown in detail in Fig. 11.

Thus, 68 is a bracket bolted or otherwise attached to the under side of the feeder frame and having its free end underlying the orifice 1 and the shears S. The free end of the bracket is provided with a semi-circular yoke 69 facing in the direction of the travel of the molds. 70 is an annular funnel holder mounted in the yoke 69 by means of its diametrically opposed trunnions 71 which are alined in a plane radial of the axis of the rotation of the mold table. The funnel Z fits down in the holder 70 and is supported therein by its circumferential shoulder 72. The holder is provided below its axis of rotation with a projection 73 parallel with and in front of the bracket 68, and 74 is a set screw screwed through a threaded hole in said projection and impinging against the front of the bracket 68. If the set screw be retracted, the influence of gravity will cause the funnel to assume a vertical position, but by screwing in the set screw against the bracket any desired inclination of the axis of the funnel's throat may be obtained to enable the gobs to be delivered properly to the molds traveling at any practical speed. To permit the funnel to be raised or lowered to accommodate molds of different heights, I may interpose one or more shims or spacers 68a between the bracket 68 and the feeder frame, as shown in Fig. 1.

What I desire to claim is:—

1. In mechanism for the manufacture of glassware having moving parts and means for varying the speed of movement of said parts, means for lubricating the moving parts thereof comprising a lubricant-discharge device disposed adjacent to the path of the moving part which is to be lubricated, means timed with the movement of the part for periodically operating said discharge device, and means for regulating the lead of the periodic operations of the discharge device to accommodate the moments of discharge to various speeds of travel of the moving part.

2. In mechanism for the manufacture of glassware having moving parts and means for varying the speed of movement of said parts, means for lubricating the moving parts thereof comprising a lubricant discharge device disposed adjacent to the path of the moving part which is to be lubricated, means for periodically supplying lubricant to said discharge device, means whereby the operation of said supply means are timed with the movement of said part, and means for regulating the timing of said supply means to accommodate the moments of lubricant-supply to various speeds of travel of the moving part.

3. In mechanism for the manufacture of glassware having moving parts and means for varying the speed of movement of said parts, means for lubricating the moving parts thereof comprising a lubricant-discharge device disposed adjacent to the path of the moving part which is to be lubricated, a supply of lubricant under pressure connected to the discharge device, valvular means interposed between said lubricant supply and said discharge device, means for periodically actuating said valvular means in timed relation to the movement of said part, and means for regulating the timing of the periodic actuations of the valvular means to accommodate the moments of lubrication to various speeds of travel of the moving parts.

4. In mechanism for the manufacture of glassware having moving parts and means for varying the speed of movement of said parts, means for lubricating the moving parts thereof comprising a lubricant discharge device disposed adjacent to the path of the moving part which is to be lubricated, a supply of lubricant under pressure connected to the discharge device, valvular means interposed between said lubricant supply and said discharge device, means for periodically actuating said valvular means in timed relation to the movement of said part, and means for regulating the timing of said actuating means to accommodate the moments of discharge to various speeds of movement of said part.

5. In mechanism for the manufacture of glassware having moving parts and means for varying the speed of movement of said parts, the combination with the moving parts of said mechanism of means for periodically supplying lubricant to said moving parts, means for timing the movements of said moving parts, means for timing the moments of application of lubricant to said parts, and means for regulating the relation between said timing means to accommodate the moments of lubricant supply to various speeds of the moving parts.

6. The combination with a feeder mechanism for producing mold charges of molten glass and which comprises a receptacle for the molten glass having a submerged discharge outlet, mechanically operated shears arranged periodically to open and close beneath the outlet to sever the masses of glass depending from the outlet and means for timing the operation of the shears, of means for periodically discharging lubricant upon the shears, and means for regulating the lubricant discharges independently of the timing of the operations of the shears.

7. The combination with a feeder mechanism for producing mold charges of molten glass and which comprises a receptacle for the molten glass having a submerged discharge outlet, mechanically operated shears arranged periodically to open and close beneath the outlet to sever the masses of glass depending from the outlet and means for timing the operation of the shears, of a nozzle arranged to discharge lubricant upon the cutting portions of the shears, a supply of lubricant under pressure connected to said nozzle, an interrupter interposed in said connection, means for periodically actuating said interrupter to admit lubricant to said nozzle, and means for regulating the timing of such actuations independently of the timing of the operations of the shears.

Signed at Pittsburgh, Pa., this 9th day of August, 1928.

WILLIAM J. MILLER.